(12) United States Patent
Byun et al.

(10) Patent No.: US 6,778,352 B2
(45) Date of Patent: Aug. 17, 2004

(54) DISK DRIVE SHOCK ABSORPTION MECHANISM

(75) Inventors: Yonkyu Byun, Yong In Si (KR); Sangeun Baek, Yong-In (KR); Haesung Kwon, San Jose, CA (US); Pyongwon Yim, Sunyvale, CA (US)

(73) Assignee: Samsung Electronics Co., Ltd., Swon (KR)

( * ) Notice: Subject to any disclaimer, the term of this patent is extended or adjusted under 35 U.S.C. 154(b) by 152 days.

(21) Appl. No.: 09/751,707

(22) Filed: Dec. 28, 2000

(65) Prior Publication Data

US 2002/0085309 A1 Jul. 4, 2002

(51) Int. Cl.[7] ............................................. G11B 33/08
(52) U.S. Cl. .................................................. 360/97.01
(58) Field of Search .......................... 360/97.01, 97.02, 360/97.03, 97.04; 369/80, 263

(56) References Cited

U.S. PATENT DOCUMENTS

| | | | | |
|---|---|---|---|---|
| 5,282,100 A | * | 1/1994 | Tacklind et al. | 360/97.02 |
| 5,781,373 A | * | 7/1998 | Tsukamoto | 360/97.02 |
| 5,877,915 A | * | 3/1999 | Ishida | 360/97.03 |
| 6,373,654 B1 | * | 4/2002 | Iwahara et al. | 360/97.01 |
| 6,496,326 B1 | * | 12/2002 | Boutaghou | 360/97.03 |

* cited by examiner

*Primary Examiner*—Tianjie Chen
(74) *Attorney, Agent, or Firm*—Gregory Smith & Associates; Jeffrey P. Aiello; Earle Jennings

(57) ABSTRACT

The present invention is a shock absorption mechanism for reducing the damage experienced by disk drives, including damage caused by a magnetic head contacting the surface of a magnetic disk, as a result of impact or shock forces experienced by the disk drive. In general, the invention is a means for partially isolating a disk assembly and a related actuator assembly from other parts of the disk drive. In the preferred embodiment the shock absorption mechanism isolates the disk assembly and the actuator assembly from the outer frame of a housing containing the disk assembly and the actuator assembly by establishing a shock energy dissipation and absorption region between a pair of isolation plates holding the disk assembly and the actuation assembly, and other parts of the disk drive.

17 Claims, 3 Drawing Sheets

DISK DRIVE SHOCK ABSORPTION MECHANISM

FIELD OF INVENTION

This invention relates generally to shock absorption mechanisms for reducing impact or shock damage to disk drives.

DESCRIPTION OF PRIOR ART

Generally, a hard disk drive performs the function of recording and reproducing information stored magnetically on a spinning disk. Such drives typically include a disk assembly and an actuator assembly. The disk assembly often includes at least one magnetic disk coupled to a hub that is turned by a motor, and the actuator assembly typically includes an actuator arm supporting components on a one end for reading and writing data to and from the magnetic disk, and coupled to a motor for enabling movement of the actuator arm at the other end.

The ability of a disk drive system's ability to withstand both internal and external shock and vibration while in operation has become increasingly important as the portability of computer systems increases. A typical external shock is one produced by the movement of the computer while the disk drive is in operation. A typical internal shock is one generated by the motion of the magnetic heads and other internal components during positioning operations. Undesirable levels of vibration may cause read/write errors, and may also delay the transfer of data because the data cannot be confidently transferred until the amplitude of vibration has substantially decayed. In addition to shifting the magnetic heads off track, certain external shocks could damage the disk drive assembly.

To prevent damage to the disk drive assembly, a number of shock absorption mechanisms have been used. Typical shock absorption mechanisms include shock-mounts supporting the disk drive assembly. The shock mounts are normally made of rubber, having a predetermined stiffness. However, such shock absorbing systems typically do not adequately address internal sources of shock. Furthermore, the disk-spindle assembly in the disk drive and actuator assembly may vibrate in different phase, which may cause the magnetic head contacting the surface of the disk, which may damage the surface of the disk.

What is needed is an improved disk drive assembly that reduces damage between the magnetic head and storage media caused by internal and external shocks, and that isolates the hub and the actuator so that they preferably vibrate in the same phase after a shock or impact.

SUMMARY OF THE INVENTION

Accordingly, the present invention is a shock absorption mechanism for reducing the damage experienced by disk drives, including damage caused by the magnetic head contacting the surface of the disk, resulting from impact or shock forces experienced by the disk drive. In general, the invention is a means for partially isolating a disk assembly and a related actuator assembly from other parts of the disk drive. In the preferred embodiment the shock absorption mechanism isolates the disk assembly and the actuator assembly from the outer frame of a housing containing the disk assembly and the actuator assembly by establishing a shock energy dissipation and absorption region between a pair of isolation plates and other parts of the disk drive. In the preferred embodiment, a bottom isolation plate is defined in a bottom wall of the housing by a series of apertures extending through the bottom wall of the housing. The top isolation plate is defined in a top wall of the housing by a series of apertures extending through the top wall of the housing. Thus, the top isolation plate and the bottom isolation plate are only connected to the rest of the housing by a series of bridges between the apertures cut in the top and bottom housing walls. The apertures are preferably slot shaped, but other shapes could be used. The shape of the isolation plates defined by the array of apertures may be configured as desired. The disk assembly and the actuator assembly extend between the top and bottom isolation plates. The isolation of the disk assembly and actuator assembly together between the top and bottom isolation plates may allow the disk assembly and the actuator assembly to oscillate in phase when subject to internal shock. The apertures are preferably covered and/or filled with a vibration dampening material that reduces vibration energy by absorbing kinetic energy and releasing the energy as heat.

BRIEF DESCRIPTION OF THE DRAWINGS

A preferred embodiment of the present invention is further described in connection with the accompanying drawings, in which.

DETAILED DESCRIPTION OF THE INVENTION

The following description is provided to enable any person skilled in the art to make and use the invention and sets forth the best mode presently contemplated by the inventor for carrying out the invention. Various modifications, however, will remain readily apparent to those skilled in the art, as generic principles of the present invention have been drafted herein.

The current invention is a shock absorption mechanism for a hard disk drive 10. In general, the invention comprises a shock energy dissipation and absorption region formed between an outer region of the drive housing 12 and isolation plates holding the disk assembly 18 and actuator assembly 24. The shock absorption mechanism of the invention is preferably used in conjunction with other known shock absorption mechanisms.

Figure 1:
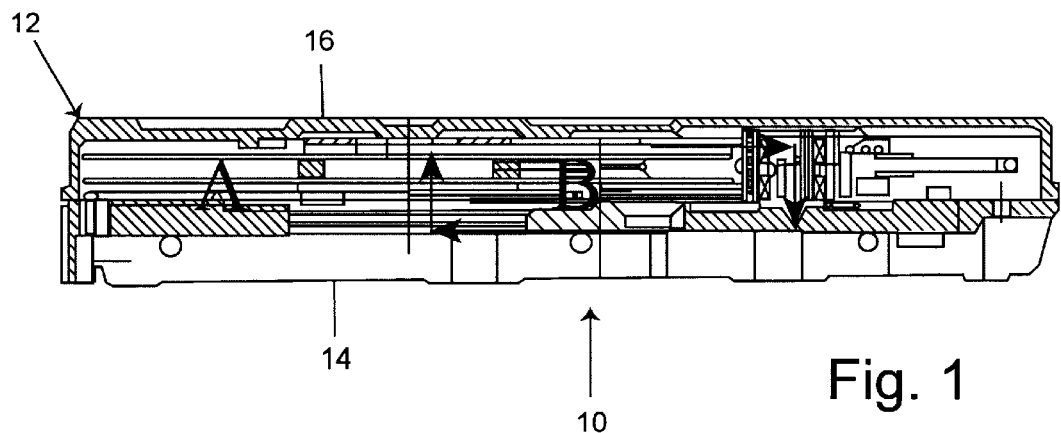
FIG. 1 is a cutaway side view of a generic disk drive showing the disk assembly and the actuator assembly.

A generic or typical disk drive 10, seen in FIG. 1 includes a housing 12 that encloses certain components, including the disk assembly 18 and the actuator assembly 24. Often, the housing 12 includes a cover 16 that fits over a base 14 enclosing and providing mechanical support and stability to components arrayed inside the housing 12. The disk assembly 18 comprises a number of disks 20 arranged in parallel planes along the length of a hub 22 and perpendicular to the axis of the hub 22. Two disks 20 are shown, but the number of disks 20 used is not critical to the invention. The spacing between the disks 20 must be sufficient for the arms of the actuator assembly 24 holding the magnetic heads to pass between the disks 20 to write to or access data from the surfaces of the disks 20. One end of the hub 22 is typically rotatably coupled to the inside surface of the cover 16, and the other end typically couples to a motor 28 mounted on the base 14. The generic actuator assembly 24 shown comprises a voice coil motor 30 configured to rotate an actuator arm 26 around an axis on a support spindle 32. The support arm typically comprises a load beam coupled to the end of the actuator arm 26 and one end, and a flexure supporting the slider, at the other end. A spindle 32 supports the actuator arms 26, and is rotatably coupled to a voice coil motor attached to the base 14 of the housing 12. When the cover 16 is placed over the base 14, the disk assembly 18 and the actuator assembly 24 are firmly secured therebetween. Although an example generic disk drive 10 structure has been described, the configuration of the disk drive 10, the disk assembly 18 and the actuator assembly 24 are not critical to the invention, and the present invention may be easily modified by one skilled in the art for use with many known disk drive configurations.

Figure 2:
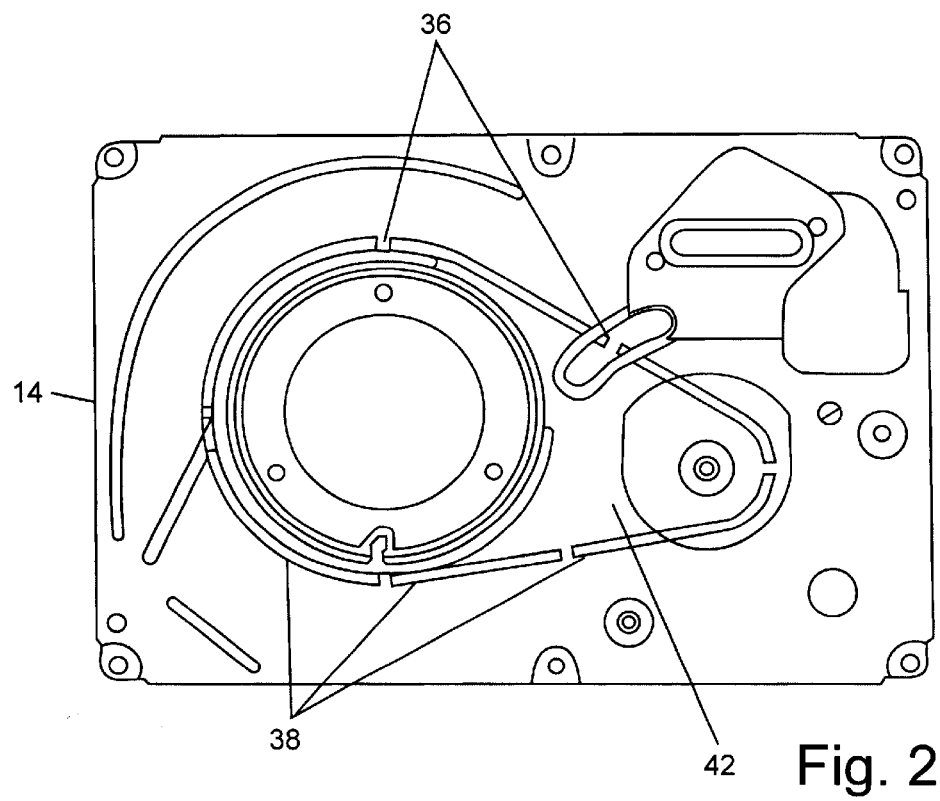
FIG. 2 is a perspective view of an embodiment of the array of slots cut through the base frame.
Figure 3:
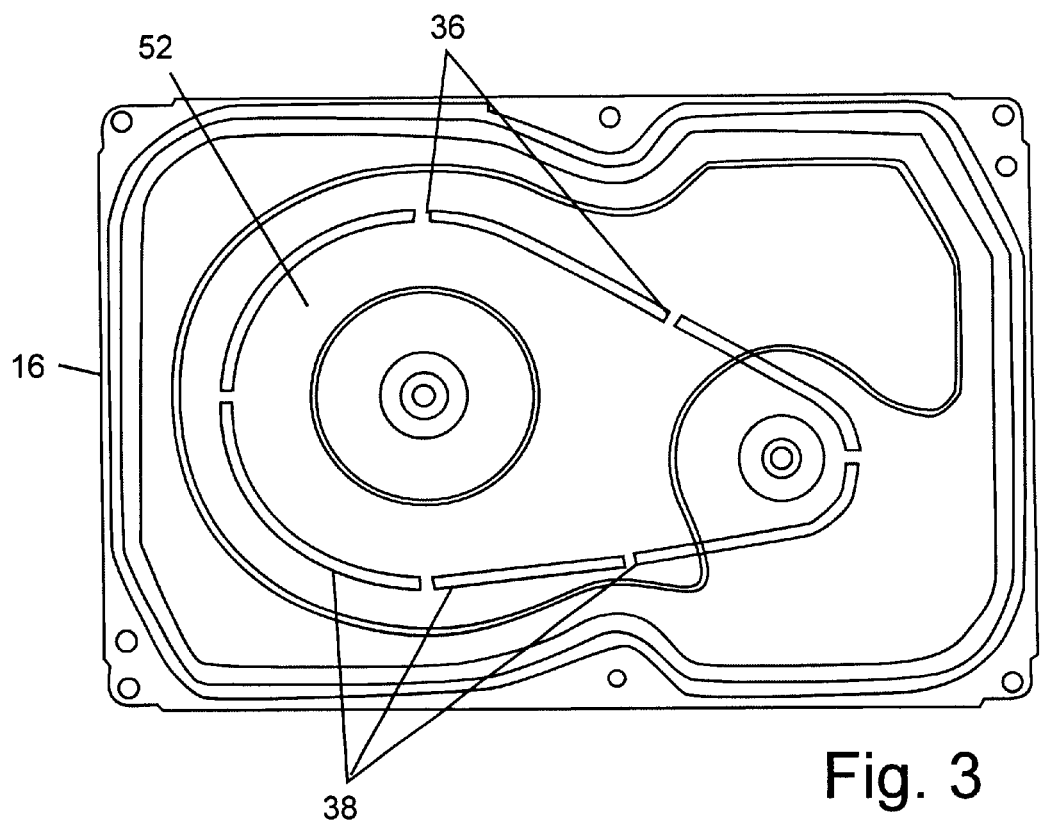
FIG. 3 is a perspective view of an embodiment of the array of slots cut through the cover frame.

Referring to FIGS. 2 and 3, the shock absorption of the invention is achieved by creating a series of apertures 38 extending through the base 14 and cover 16 of the housing 12 in a configuration generally surrounding the disk assembly 18 and the actuator assembly 24; thus isolating the disk assembly 18 and actuator assembly 24 from the outer portions of the housing 12. The apertures 38 are preferably covered and/or filled with a vibration dampening material 60.

FIG. 2 shows a preferred embodiment of the base 14 with an array of apertures 38 made in the bottom wall of the base 14 to define a base isolation plate 42. The apertures 38 are preferably slot shaped as seen in FIG. 1, however, in alternate embodiments the apertures 38 could be formed in any desired or functional shape. The base isolation plate 42 is connected to the bottom wall of the base 14 by a series of bridges 36 between adjacent apertures 38 in the array of apertures 38. The array of apertures 38 shown in FIG. 1 create a base isolation plate 42 that is somewhat water drop shaped, however, in alternate embodiments, the shape of the base isolation plate defined by the array of apertures 38 may be modified to as desired.

FIG. 3 shows a preferred embodiment of the cover 16 of the housing 12 with an array of apertures 38 made in the top wall of the cover 16 to define a cover isolation plate 52. The apertures 38 are preferably similar in shape to the apertures 38 formed in the base 14, however, in alternate embodiments the apertures 38 may be formed in a different desired or functional shape. The cover isolation plate 52 is connected to the top wall of the cover 16 by a series of bridges 36 between adjacent apertures 38 in the array of apertures 38. The array of apertures 38, shown in FIG. 3, preferably defines a cover isolation plate 52 substantially similar in shape to the shape of the base isolation plate 42. However, in alternate embodiments it maybe preferably to define a cover isolation plate 52 that differs in shape from the base isolation plate 42.

When the cover 16 is fastened over the base 14, independent movement of the disk assembly 18 and the actuator assembly 24, other than rotational motion, is firmly restricted so that vibrations experienced by one isolation plate are transmitted through the disk assembly and actuator assembly to the other isolation plate. Thus, the cover isolation plate 52, the base isolation plate 42, the disk assembly 18, and the actuator assembly 24 may tend to vibrate in a uniform phase. Since the disk assembly 18 and actuator assembly 24 are firmly connected at one end to the to the base isolation plate 42 and at the other end to the cover isolation plate 52, the relative motion between the disk assembly 18 and the actuator assembly 24 is restricted. The isolation of both the disk assembly 18 and the actuator assembly 24 together from the other parts of the disk drive 10 facilitates the oscillation in phase of the disk assembly 18 and actuator assembly 24 when subject to impact, shock, or other source of vibration.

Figure 4:
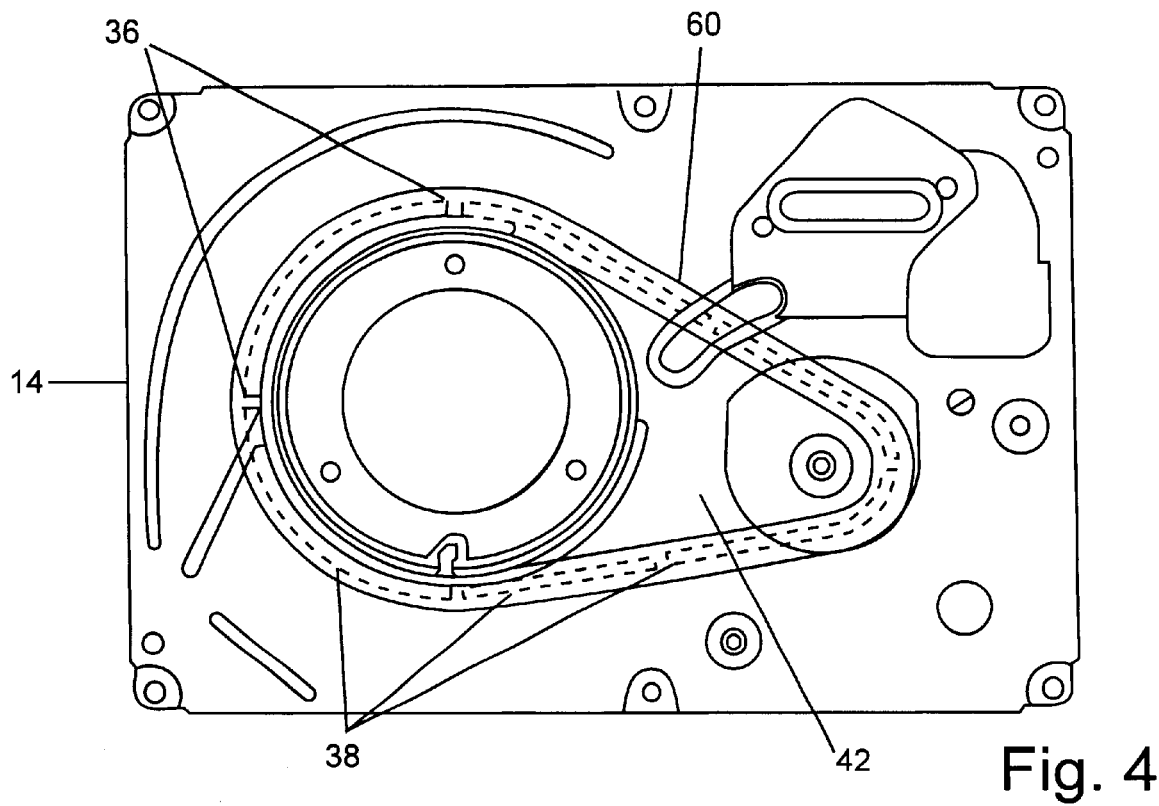
FIG. 4 is a perspective view of an embodiment of the array of slots cut through the base frame filled with elastic dampening material.
Figure 5:
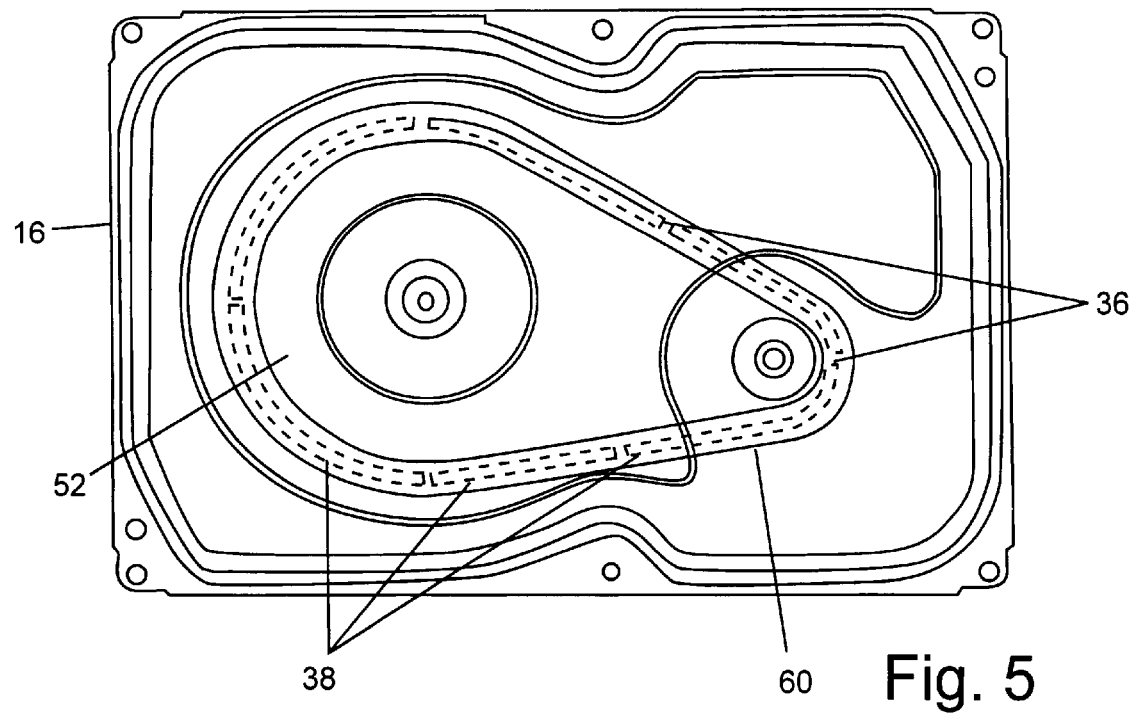
FIG. 5 is a perspective of view of an embodiment of the array of slots cut through the cover frame filled with elastic dampening material.
Figure 6:
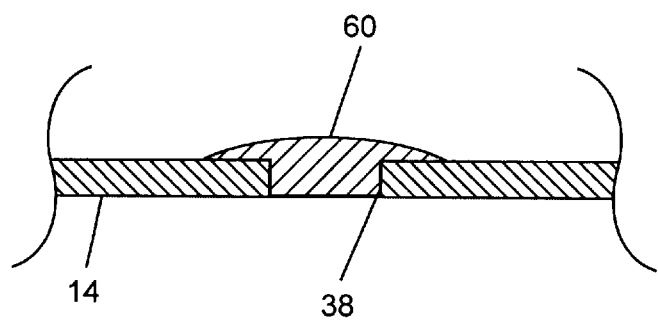
FIG. 6 is a cutaway view of an embodiment of the invention showing an aperture formed in the base with a dampening material overlaying and filling the aperture.

A vibration dampening material 60 is preferably molded over the apertures 38, preferably extending some distance on either side of the apertures 38 as seen in the FIG. 3 and FIG. 4. The purpose of the vibration dampening material 60 is to reduce vibrations experienced by the base and cover isolation plates 42 and 52 by reducing mechanical vibration by absorbing kinetic energy and releasing the energy as heat. In some preferred embodiments the vibration dampening material 60 may also enter the apertures 38 as seen in FIG. 6, which is a cutaway side view of an aperture 38. It is preferable that the vibration dampening material 60 be formed primarily on the inside surface of the cover 16 and the base 14. However, in alternate embodiments the vibration dampening material 60 may be formed on the exteriors surfaces of the cover 16 and the base 14, or on both the interior and exterior surfaces of the cover 16 and the base 14. Any suitable material may be used for the vibration dampening material 60, including a photosetting polymer such as a silicone elastomer.

The preferred embodiments described herein are illustrative only, and although the examples given include many specificities, they are intended as illustrative of only a few possible embodiments of the invention. Other embodiments and modifications will, no doubt, occur to those skilled in the art. The examples given should only be interpreted as illustrations of some of the preferred embodiments of the invention, and the full scope of the invention should be determined by the appended claims and their legal equivalents.

What is claimed is:

1. A shock absorption mechanism for a hard disk drive assembly comprising:

a base including a bottom wall, and a series of apertures formed in the bottom wall of the base to define a base isolation plate, a cover including a top wall, and a series of apertures formed in the top wall of the cover to define a cover isolation plate, a disk assembly extending between the base isolation plate and the cover isolation plate, an actuator assembly extending between the base isolation plate and the cover isolation plate, a vibration dampening material laying over the series of apertures formed in the bottom wall of the base, a vibration dampening material laying over the series of apertures formed in the top wall of the cover, wherein the bottom wall, and the aperture series formed in the bottom wall define the base isolation plate is further comprised of:

the base isolation plate connected to the bottom wall of the base by bridges between the adjacent apertures formed in the bottom wall, and wherein the top wall, and the aperture series formed in the top wall of the cover to define the cover isolation plate is further comprised of:

the cover isolation plate is connected to the top wall of the cover by bridges between the adjacent apertures formed in the top wall;

wherein the series of apertures formed in the bottom wall extend in a configuration generally surrounding the disk assembly and the actuator assembly;

wherein the series of apertures formed in the top wall extend in a configuration generally surrounding the disk assembly and the actuator assembly.

2. The apparatus of claim 1, wherein the cover fits over the base to define a chamber.

3. The apparatus of claim 2, wherein the disk assembly and the actuator assembly are positioned within the chamber.

4. The apparatus of claim 1, wherein the apertures are slot shaped.

5. The apparatus of claim 1, wherein an arrangement of the apertures formed in the base are approximately identical to an arrangement of the apertures formed in the cover.

6. The apparatus of claim 1, wherein the dampening material comprises an elastomeric material.

7. A disk drive comprising:

a housing including a base and a cover, the base including a bottom wall defining an opening in the bottom wall having an inner edge, and the cover including a top wall defining an opening in the top wall having an inner edge, a cover isolation plate with an outer edge positioned within the opening in the top wall of the cover, the cover isolation plate being coupled to the cover by a plurality of bridges between the cover and the cover isolation plate so that a series of apertures are defined by the space between outer edge of the cover isolation plate, the inner edge of the aperture in the cover, and the plurality of bridges, a base isolation plate with an outer edge positioned within the opening in the bottom wall of the base, the base isolation plate being coupled to the base by a plurality of bridges between the base and the base isolation plate so that a series of apertures are defined by the space between outer edge of the base isolation plate, the inner edge of the aperture in the base, and the plurality of bridges, a disk assembly extending between the base isolation plate and the cover isolation plate, an actuator assembly extending between the base isolation plate and the cover isolation plate, a dampening material laying over the apertures between the cover isolation plate and the top wall of the cover, a dampening material laying over the apertures between the base isolation plate and the bottom wall of the base;

wherein the series of apertures formed in the bottom wall extend in a configuration generally surrounding the disk assembly and the actuator assembly;

wherein the series of apertures formed in the top wall extend in a configuration generally surrounding the disk assembly and the actuator assembly.

8. The disk drive of claim 7, wherein the cover fits over the base to define a chamber.

9. The disk drive of claim 8, wherein the disk assembly and the actuator assembly are positioned within the chamber.

10. The disk drive of claim 7, wherein the apertures are slot shaped.

11. The disk drive of claim 7, wherein an arrangement of the apertures formed in the base are approximately identical to an arrangement of the apertures formed in the cover.

12. The disk drive of claim 7, wherein the dampening material comprises an elastomeric material.

13. A housing supporting the shock adsorption mechanism of claim 1, comprising:

the base including the bottom wall, and the series of apertures formed in the bottom wall of the base to define the base isolation plate, the cover including the top wall, and the series of apertures formed in the top wall of the cover to define the cover isolation plate, the vibration dampening material laying over the series of apertures formed in the bottom wall of the base, the vibration dampening material laying over the series of apertures formed in the top wall of the cover, wherein the bottom wall, and the aperture series formed in the bottom wall define the base isolation plate is further comprised of:

the base isolation plate connected to the bottom wall of the base by bridges between the adjacent apertures formed in the bottom wall, and wherein the top wall, and the aperture series formed in the top wall of the cover to define the cover isolation plate is further comprised of:

the cover isolation plate is connected to the top wall of the cover by bridges between the adjacent apertures formed in the top wall.

14. A method of making a disk drive using the housing of claim 13, comprising the step of:

positioning the disk assembly to extend between the base isolation plate and the cover isolation plate; and positioning the actuator assembly to extend between the base isolation plate and the cover isolation plate.

15. The disk drive as a product of the process of claim 14.

16. A method of absorbing shock in a disk drive containing a cover isolation plate and a base isolation plate, wherein a disk assembly and an actuator assembly both extend between the cover isolation plate and the base isolation plate, comprising the steps of:

a base absorbing shock through bridge couplings with the base isolation plate between a series of apertures filled with a vibration dampening material; and a cover absorbing shock through bridge couplings with the cover isolation plate between a series of apertures filled with a vibration dampening material;

wherein the series of apertures formed in the bottom wall extend in a configuration generally surrounding the disk assembly and the actuator assembly;

wherein the series of apertures formed in the top wall extend in a configuration generally surrounding the disk assembly and the actuator assembly.

17. The method of claim 16, comprising the steps of:

the base isolation plate and the cover isolation plate collectively aiding the disk assembly and the actuator assembly to vibrate in phase with each other.

* * * * *